UNITED STATES PATENT OFFICE.

SERVETUS T. ACHOR, OF KENNETT SQUARE, PENNSYLVANIA.

EMULSIFIED CHOCOLATE PRODUCT.

983,014.     Specification of Letters Patent.     Patented Jan. 31, 1911.

No Drawing. Original application filed January 17, 1906, Serial No. 411,336. Renewed May 14, 1910, Serial No. 561,321. Divided and this application filed May 13, 1909. Serial No. 495,721.

*To all whom it may concern:*

Be it known that I, SERVETUS T. ACHOR, a citizen of the United States, residing at Kennett Square, in the county of Chester and State of Pennsylvania, have invented certain new and useful Improvements in Emulsified Chocolate Products, of which the following is a specification.

This invention relates to a soluble emulsified chocolate product having the cocoa-butter in an emulsified condition with the other natural constituents of chocolate and with added sugar and milk, in convenient and agreeable form for preparing a nutritious beverage and confectionery.

The object of my invention is to provide a highly nutritious, and an easily digestible and assimilable chocolate product, containing the constituents of high grade chocolate and in which the oily portion or cocoa-butter is thoroughly emulsified with liberated starch and the other natural cocoa constituents, and with added sugar and milk, in suitable proportions for making an agreeable beverage by addition of hot water, or for making various kinds of confections.

My soluble emulsified chocolate may be pressed into tablets, but is preferably in dry, granular condition, comparatively soft, porous and friable, and instantly soluble in hot water or milk for producing a delicious, refreshing beverage.

The unsweetened or bitter chocolate of commerce contains starch, albuminoids, other carbohydrates, oil and theobromin in suitable proportions to make an exceedingly nutritious and mildly stimulating article of diet.

The unscientific methods now used in preparing chocolate or cocoa for a beverage have the effect of liberating the oil and causing it to rise to the top of the fluid mixture in the form of large floating globules. This liberated oily portion, besides being difficult of digestion, is objectionable in appearance. If a chocolate beverage thus prepared is freely and frequently indulged in it tends to distress the stomach and cause skin eruptions. I therefore so prepare the chocolate as to completely emulsify the oil, diffusing it in a minutely divided condition throughout the other ingredients of the preparation, so that it is occluded and held in a permanent emulsified condition. In this finely divided and diffused condition the oil is easily digestible and assimilable, and does not appear in objectionable globules in the prepared beverage.

The bitter astringent property of ordinary chocolate has the deleterious effect of producing constipation and other organic disorders; and in order to overcome this I provide in my product a relatively large proportion of milk albumen with most satisfactory results.

In preparing my soluble emulsified chocolate, I take of commercial bitter chocolate about fifty pounds, suitably broken into lumps, and apply sufficient heat to melt the same without injuring the delicate aroma and flavor of the chocolate, preferably in a pan over a water-bath, or in a steam-jacketed vessel, and when suitably softened or melted I add about seventy-five pounds of sugar, preferably granulated cane sugar, and thoroughly mix it with the melted chocolate. This operation is continued, with a suitable stirring and mixing apparatus for about ten to twenty minutes, and until the grains are uniformly mixed through the mass of material, with the result that the cocoa-butter, or oil, is minutely divided and spread in thin films on the grains of sugar. This result having been attained, there is added a suitable proportion of milk. I have obtained the most satisfactory results by using unsweetened, evaporated or condensed milk, of such a density that one quart equals about three to four quarts of straight fluid milk.
To the above proportions of chocolate and sugar I add about twenty quarts, forty to fifty pounds, of condensed milk. By continued heat and agitation the condensed milk is thoroughly mixed with the other ingredients of the mass while in a semi-liquid or plastic condition. As the temperature is gradually raised to about 212 degrees Fahrenheit, the starch cells of the cocoa become swollen and burst, liberating the starch.
The whole mass swells up and thickens something like thick mush. The liberated starch immediately absorbs the minutely divided cocoa-butter, or combines with it to form a fixed emulsion. The albumin of the milk becomes coagulated by action of the heat and entangles and holds the finely divided and diffused oil, and assists in making the emulsion permanent. The albumin of the added milk, being in relatively large proportion, has the beneficial effect of neutralizing the astringent bitter property of the chocolate, thus overcoming the tendency thereof to produce constipation and other disorders of the digestive organs. A perfect emulsion having been produced and made permanent by the action of the liberated starch and albuminous material, the heat and agitation are continued at a low temperature, to a sufficient extent to cause slow evaporation of the moisture and reduce the mass to a viscous condition. The steam or hot water is now shut off from the vessel, but the stirring operation is preferably continued until the mass is brought to a creamy condition, so that when cooled it will readily crumble. The product is then removed from the vessel and allowed to cool, being preferably spread in layers from one inch to an inch and a half thick.

The layers or cakes are porous and friable and can be readily comminuted; they are reduced to a granular condition by a suitable mill. To preserve the delicate aroma and flavor the product is preferably put up in air tight jars or cans.

By my process a product is produced having the peculiar and agreeable odor and flavor characteristic of the best chocolate or cocoa. The starchy and albuminoid constituents being thoroughly cooked, and the product containing the requisite proportions of sugar and milk, a delicious and refreshing beverage may be made by simply dissolving the granular emulsified chocolate in hot water. One of the advantages of the thorough emulsification of the oil in a fixed condition will be apparent when the product is dissolved in water, as the resulting beverage will be of agreeable appearance and free from oily globules.

In order to preserve the delicate aroma and flavor of the chocolate, the operation of mixing sugar with the melted chocolate is conducted at a temperature of about 120° Fahrenheit. It is desirable to maintain the temperature between 110° and 130° F.

Straight fluid milk may be added to the batch of melted chocolate and sugar and the batch then subjected to stirring and evaporation as above described, but I prefer to use the evaporated or condensed, unsweetened milk in order to shorten the operation of cooking the chocolate, and, further, to make the product richer in milk constituents, particularly albumin, and, therefore, more nutritious and valuable as a food and less apt to derange the digestive organs.

The above described process of preparing emulsified chocolate is made the subject of claims in a copending application, Serial Number 561,321, which is a renewal of application Number 411,336, of which this is a division, and therefore the process is not herein claimed.

Having thus described my invention, what I claim as new and desire to secure by Letters Patent, is—

1. A prepared chocolate product containing the constituents of chocolate, added sugar and milk in substantially the proportions specified and having the cocoa-butter thoroughly emulsified with the cooked and liberated starch of the chocolate.

2. A prepared chocolate product containing sugar and milk and having the cocoa-butter in a thoroughly emulsified condition, the ingredients being in suitable proportions for producing a beverage by the addition of hot water.

3. A soluble emulsified chocolate product containing the normal constituents of chocolate and having the cocoa-butter thoroughly emulsified with the starch liberated from the burst cells, albumin, added sugar and milk constituents, in substantially the proportions specified.

4. A soluble emulsified chocolate product containing the normal constituents of chocolate or cocoa, having the normal proportions of cocoa-butter thoroughly emulsified with the starch liberated from the burst cells, albuminous material and suitable proportions of sugar and milk constituents, in dry granular form.

In testimony whereof I affix my signature in presence of two witnesses.

SERVETUS T. ACHOR.

Witnesses:
JOSEPH H. PUSEY,
JACOB E. BROWNING.